United States Patent
Aubrey et al.

[11] Patent Number: 5,580,158
[45] Date of Patent: Dec. 3, 1996

[54] RETROFIT LIGHT FIXTURE

[76] Inventors: Truman R. Aubrey, 1472 Beaudry Blvd., Glendale, Calif. 91208; Steven R. Gerke, 324 Orangecrest Ave., Azusa, Calif. 91702

[21] Appl. No.: 257,022
[22] Filed: Jun. 8, 1994
[51] Int. Cl.[6] .................................................. H01R 33/00
[52] U.S. Cl. ..................... 362/226; 362/260; 362/263; 439/226; 439/518
[58] Field of Search ........................ 362/304, 305, 362/368, 147, 263, 260, 265, 362, 457, 458, 226, 261; 439/226, 231, 188, 518, 236

[56] References Cited

U.S. PATENT DOCUMENTS

| | | | |
|---|---|---|---|
| 4,054,790 | 10/1977 | Slaughter | 362/265 X |
| 4,723,200 | 2/1988 | Troen | 362/260 |
| 4,750,096 | 6/1988 | Lim | 362/260 X |
| 4,920,459 | 4/1990 | Rothwell, Jr. et al. | 362/265 X |
| 4,942,503 | 7/1990 | Lyons | 362/263 X |
| 5,073,845 | 12/1991 | Aubrey | 362/260 X |
| 5,189,339 | 2/1993 | Peshak | 362/260 X |
| 5,307,254 | 4/1994 | Russello et al. | 362/147 X |

*Primary Examiner*—Denise L. Gromada
*Assistant Examiner*—Thomas M. Sember
*Attorney, Agent, or Firm*—G. Donald Weber, Jr.

[57] ABSTRACT

A retrofit unit for replacing conventional incandescent light bulbs with fluorescent tubes. A retrofit ballast and a fluorescent tube receptable are adapted to be used in conjunction with conventional light fixtures, including surface mounted or recessed fixtures. The retrofit conversion from incandescent light sources to fluorescent tubes (or the like) is accomplished without removing or replacing the existing incandescent fixture.

16 Claims, 3 Drawing Sheets

U.S. Patent    Dec. 3, 1996    Sheet 1 of 3    5,580,158
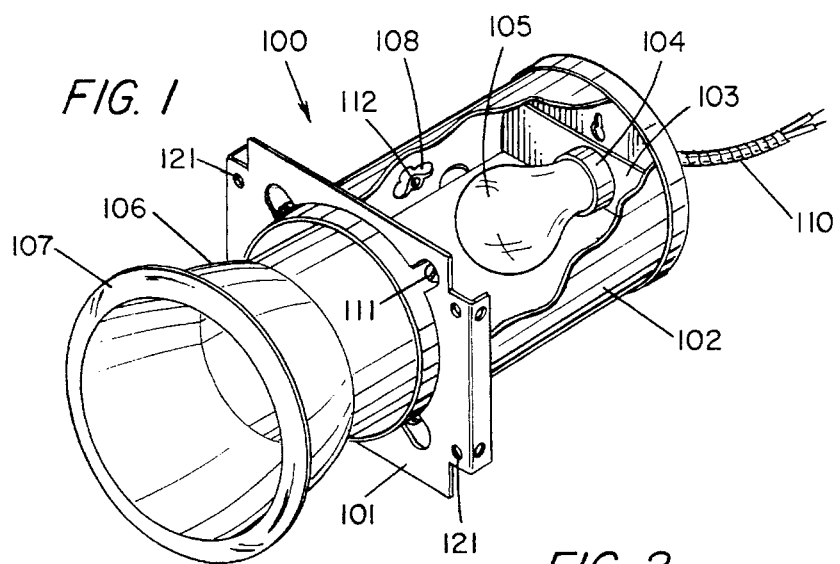
FIG. 1
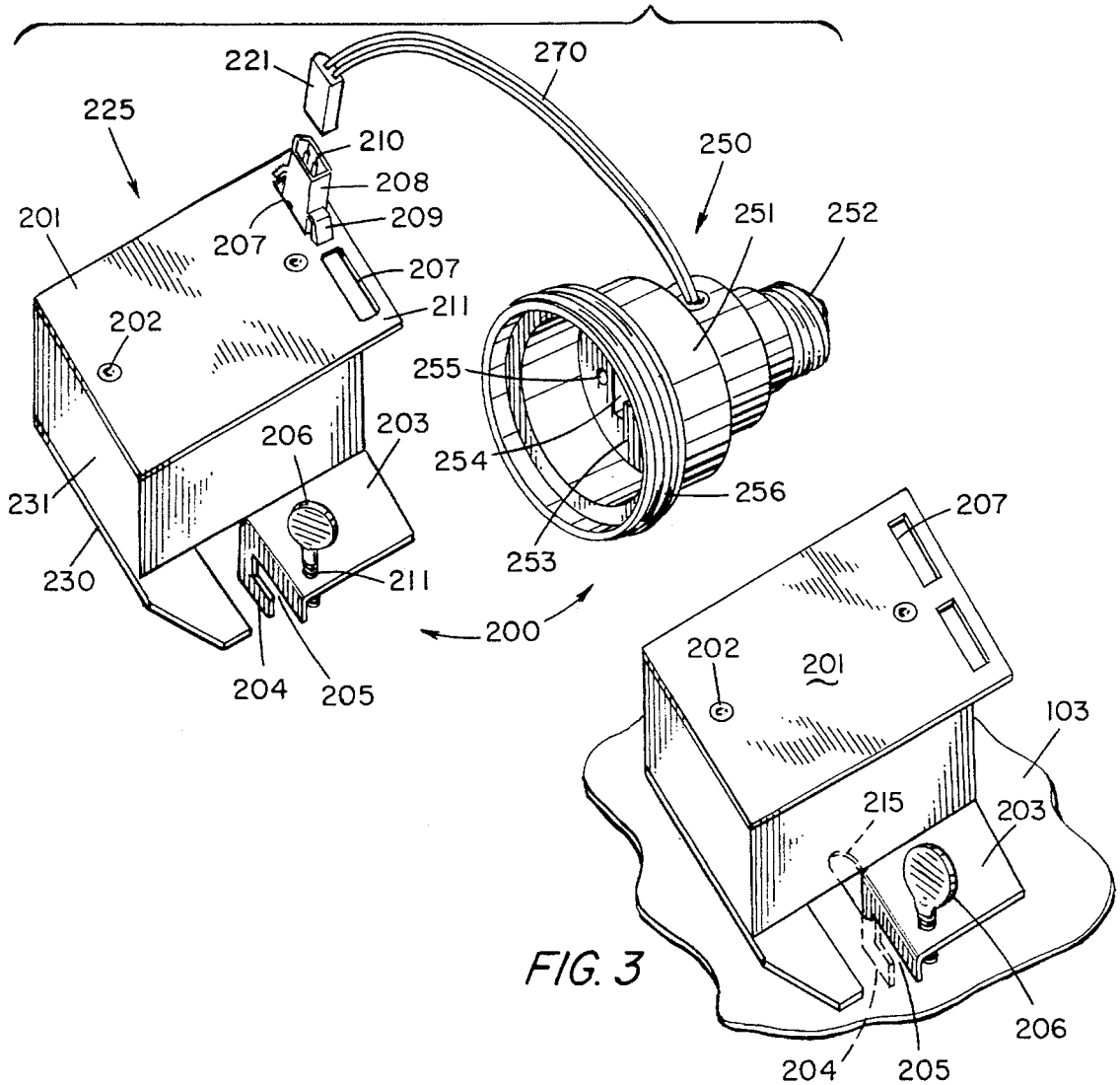
FIG. 2
FIG. 3

RETROFIT LIGHT FIXTURE

BACKGROUND

1. Field of the Invention

This invention is directed to light fixtures, in general, and, more particularly, to a light fixture which is readily converted from a fixture which uses conventional incandescent light bulbs to a fixture which uses fluorescent tubes.

2. Prior Art

There are many types of light fixtures which are known in the art. These include recessed fixtures, surface mounted fixtures, track-light fixtures and the like. Most of the known light fixtures use incandescent light sources therein. However, incandescent light sources have a short life and are inefficient. The number of lumens generated per electrical watt consumed is, generally, in the uneconomical range of about 14 to 17 lumens per watt.

In addition, these types of light sources generally use a thin filament which glows when heated by electrical power and tends to burn out or break rather easily.

Also, incandescent light sources tend to generate a large amount of heat which is given off into the surrounding area. This has the secondary shortcoming of producing heat in many places where excessive heat is not desired. Consequently, it becomes necessary to use air conditioning equipment or the like to counteract this unwanted heat.

Clearly, incandescent light sources tend to consume and waste energy. Power companies, as well as government agencies, and the like are becoming aware of the energy that can be conserved by changing out inefficient incandescent light bulbs in favor of fluorescent or other types of energy efficient light sources.

Several types of alternative light sources are known in the art. For example, fluorescent, high pressure sodium and metal halide lamps, and the like, are typical. These light sources generally tend to operate quite efficently and to provide 50 to 120 lumens per watt. The lower wattages do not, as a rule, produce excess heat during operation.

Many power companies have addressed the increasing demand for energy efficient lighting by employing fluorescent adapters that screw into existing incandescent lighting sockets. This facilitates the conversion of light sources with a resulting energy savings of 60% or more. Thus, many utilities have actually embarked upon programs to offer cash rebates to the customers who convert light sources. Alternatively, such companies have even given away energy-saving light bulbs in an effort to shed electrical load demands.

However, these alternative light sources are normally not interchangeable with conventional incandescent lamps or bulbs. For one thing, the different light sources may have different couplings or bases, as is the case with a fluorescent tube. The "Edison-base" coupling which is common on the ordinary incandescent lamp and light fixture will not accept standard fluorescent fittings.

Conversely, certain light sources such as electric-discharge lamps require a ballast in order to operate. For example, high pressure sodium and metal halide lamps with screw bases can be screwed into an Edison-base socket, but they cannot operate without a ballast which is used to deliver the appropriate circuit (i.e. voltage, current and waveform) for starting and operating. Also, the term "ballast" refers to a step down transformer. Typically, a ballast which steps down the line voltage of 120 volts to operate 12 volt lamps is contemplated.

In essence, the ballast is used to deliver the proper voltage to a particular light source. The wattage of the lamp, the lamp type and the line voltage will dictate the specific ballast design to match the lamp. For example, line voltage is normally 120 volts or 277 volts. However, other voltages may be encountered. Therefore, a specific ballast must be used to drive a specific lamp.

In order to convert an existing inefficient incandescent lighting system to a more efficient light source, it has been necessary to replace the existing lighting fixture with a totally new lighting fixture that incorporates the proper socket configuration and a ballast assembly.

Certain retrofit light fixtures were developed which included ballasts built into the fixture itself or an attached housing. These light fixtures, however, required an ample amount of space within the existing fixture to include the ballast and socket assemblies.

Consequently, it is highly desirable to develop light fixtures which permit these alternative light sources to be retrofitted into existing electrical system hardware efficiently and economically.

PRIOR ART STATEMENT

The most pertinent prior art known to applicant is listed herewith in patent number order. No special significance is given to any particular patent or to any prior art not known to applicant.

U.S. Pat. No. 5,073,845; FLUORESCENT RETROFIT LIGHT FIXTURE; T. Aubrey. This patent is directed to a retrofit light fixture with the ballast mounted on the splice box of the fixture.

U.S. Pat. No. 4,327,402; LIGHT FIXTURE; T. Aubrey. This patent is directed to an adjustable, retro-fit fluorescent light fixture with a telescoping adjustment mechanism.

U.S. Pat. No. 3,660,651; ADJUSTABLE LIGHT FIXTURE; E. Miles, Jr. This patent is directed to an adjustable light fixture using a pair of levered arms to adjust the position of the lamp.

U.S. Pat. No. 4,232,361; ADJUSTABLE LIGHT FIXTURE; J. Kelsall. This patent is directed to an adjustable light fixture with a plurality of resilient tracks for adjusting the position of the light fixture.

U.S. Pat. No. 4,520,436; LAMP APPARATUS; R. McNair et al. This patent is directed to a lamp apparatus which includes a reflector and an integral trim ring.

U.S. Pat. No. 4,595,969; LAMP MOUNTING APPARATUS AND METHOD; R. McNair. This patent is directed to a retro-fit lamp fixutre using a plastic strap with a "gripper" which is connected to and slidable along the strap.

U.S. Pat. No. 4,704,664; LAMP APPARATUS; R. McNair. This patent is directed to substantially the same device as the U.S. Pat. No. 4,520,436 with the addition of a cover to enclose the ballast and sockets.

U.S. Pat. No. 06/679,281; LAMP APPARATUS; R. McNair. This application is a continuation-in-part application of U.S. Pat. No. 4,704,664 noted-above.

Swiss Patent No. 7241; SUSPENSION DEVICE FOR INCANDESCENT LAMPS; H. Rentzch. This patent is directed to a device for counterbalancing a lamp suspended by a light cord.

SUMMARY OF THE INVENTION

This invention is directed to a retrofit lighting fixture wherein incandescent light sources are replaced by fluorescent light sources or the like. Adapter bases which receive these light sources and are capable of direct insertion into the existing screw-base receptacle are provided. Also, a ballast that can be easily mounted directly into the existing light fixture is provided. The ballast is connected into the electrical circuit with the screw-in lamp adapter. In one embodiment, a single snap-in connector is utilized to form this connection. Also, the fluorescent light sources can be used with threaded reflectors, separate mounting bases and the like in order to enhance the retrofit efficiency and desirability.

BRIEF DESCRIPTION OF THE DRAWINGS

FIG. 1 is a partially exploded, partially broken away representation of a conventional light fixture with an incandescent light source therein.

FIG. 2 is an exploded view of a retrofit kit which includes a fluorescent light source adapter socket and a ballast apparatus which can be utilized to convert the light fixture of FIG. 1 to use with a fluorescent light source.

FIGS. 3 and 4 are different views of the ballast apparatus portion of the kit shown in FIG. 2 mounted to a portion of a light fixture.

DESCRIPTION OF A PREFERRED EMBODIMENT

Figure 5:
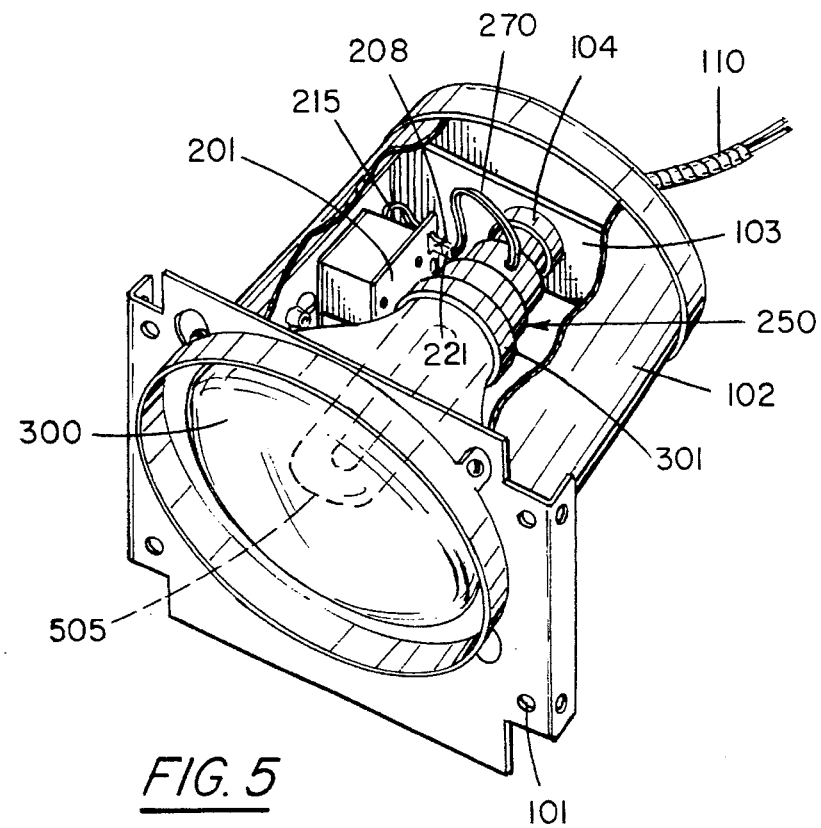
FIG. 5 is a representation of the existing light fixture of FIG. 1 with the kit of FIG. 2 installed and with a fluorescent light source mounted in the adapter.

Referring now to FIG. 1, there is shown a partially-exploded, partially-broken away, perspective view of a recessed light fixture 100 known in the prior art. In this context, "light fixture" is intended to define the structure which is used to mount and/or house a light source.

In particular, the existing light fixture 100 includes a receptacle 102 and a face plate 101. The receptacle is also referred to in the art as a can. The face plate is also known as a mounting plate. The can 102 is, in conventional fashion, connected to the mounting plate 101 by means of screws 109. In particular, the screws 109 pass through holes in the can 102 and into tapped holes in ears 111 in the mounting plate 101. Thus, the can 102 is connected to the mounting plate 101 for mounting in a ceiling or other recessed arrangement.

The fixture 100 includes a support plate 103 which is movably mounted within can 102. Typically, a wing nut 108 is used to tighten a screw 112 which is affixed to the inner surface of can 102 and which mates with an opening in the mounting structure 103. Of course, multiple screws and wing nuts can be utilized.

In the conventional case, the support 103 is L-shaped or U-shaped and can be moved up or down within the can 102, as required, to accommodate a light source. In this context, "light source" is intended to define a light bulb, a fluorescent tube or any other similar light emitting device.

The light source 105 is a conventional incandescent light bulb which is mounted in a conventional Edison-type socket 104. The socket 104 is mounted in the movable support structure 103. Alternatively, the light bulb 105 can be a type "R" reflector floodlight or the like.

The fixture 110 may include a reflector 106 and a trim ring 107 (as shown) which are affixed to the fixture 100 when it is mounted in the appropriate location. For example, the fixture 100 can be attached to supporting joists or the like by means of hanger bars, nails, screws or other fastening devices which pass through the mounting holes 121 in plate 101.

The electrical connection is accomplished by means of a suitable wire 110, which is, in this application, shown as a BX cable. Of course, other types of wiring are known in the art. Moreover, the wire 110 can be affixed to the fixture 100 in any known fashion.

In typical building construction, the conventional unit shown in FIG. 1 is mounted in the ceiling to provide a down light arrangement. The fixture 100 is, preferably, recessed into the ceiling. Of course, light fixtures protruding from the ceiling can be included in this discussion. However, the replacement effort is not so intensive.

These types of fixtures are well known and utilize incandescent light bulbs which contribute the difficulties noted above. While it is desirable to retrofit these fixtures to operate with fluorescent light bulbs (or tubes) to obtain the inherent advantages thereof, it is not easy to do so. The conventional practice is to remove the entire fixture. Obviously, to replace all of the existing recessed light fixtures of the type shown and described above would be incredibly expensive and, therefore, undesirable.

The conventional incandescent socket has a wiring circuit consistent with most electrical equipment. Two supply wires, a black (hot) and white (common) wire that complete a circuit and supply the needed current to the socket. Conversely, the retrofit kit used in this device is unique and an important feature of the subject invention.

If the conventional fluorescent socket adapter is installed (without the instant retrofit kit), the full line signal of approximately 120 volts is delivered to the pins located within the fluorescent socket. Inasmuch as most small wattage single ended fluorescent lamps operate on only about 60 volts, the 120 volts would destroy the fluorescent light source. Thus, a direct one-for-one exchange is not feasible.

Referring now to FIG. 2, there is shown a retrofit conversion kit 200 which can be used with recessed light fixtures of the type shown in FIG. 1. With the use of the retrofit kit 200 (shown in FIG. 2), the existing recessed light fixtures 100 (shown in FIG. 1) can be utilized with fluorescent light bulbs without the necessity of expensive repair and/or replacement. Rather, the incandescent light bulb 105 is removed from the fixture 100 and the kit 200 shown in FIG. 2 is inserted. The existing recessed light fixture 100 is, thus, converted to use fluorescent light bulbs (not shown).

The retrofit kit 200 shown in FIG. 2 includes a ballast apparatus 225 and an adapter socket 250 for a fluorescent light bulb. The ballast (not shown per se) is, typically, of a simple reactance magnetic core and coil type. However, electronic ballasts are also contemplated. Simple reactance "choke" ballasts have a normal power factor, usually in the range of 50% power factor. Utility companies often require high power factor devices of 90% or greater. Capacitors are used to accomplish this end. The capacitor is wired across the line and accomplishes the power factor correction and provides the desired high power factor option. A capacitor of the appropriate value is housed within the ballast housing 225.

In this embodiment, the ballast apparatus 225 includes a housing 201 which is fabricated of a strong, light weight material, such as, but not limited to, aluminum. Plastic or other suitable material can be used. The housing 201 is used to support and enclose the ballast which is necessary to permit operation of a fluorescent light bulb. The panels of housing box 201 are held together by rivets 202 or other suitable fasteners when the ballast has been mounted therein.

One panel of the ballast housing 201 is enlarged and provides an extended surface 203. The surface 203 can be an extension of a side panel or the back panel 230 of the housing box 201. The extended surface 203 is cut and a portion thereof is bent away from the box 201 to thereby provide the hook 204 and the included gap 205. Typically, the hook 204 can be formed by properly cutting and bending a portion of the surface 203. Of course, the hook 204 (with the included gap) can be attached separately to the surface 203.

The hook 204 is designed to pass through a hole or an elongated slot formed in the sides of many down lights cans. Thus, the ballast apparatus 225 is mounted to the inside of the down light can 102. Typical examples of this type of down light cans are the Halo H-7 and Capri R10 which are similar to can 102 shown in FIG. 1.

A thumb screw 206 is mounted in a threaded hole 211 which passes through the surface 203. Once the hook 204 has engaged the can 102, the thumb screw 206 or other type set screw is turned to engage the surface of can 102 thereby to provide a secure mounting of the ballast unit 225.

While the hook 204 is the preferred embodiment, the ballast apparatus 225 can, alternatively, be secured to the can 102 by the wing nut adjustment mechanism, or simply held in place with screws or other type of suitable fastener or bracket on any surface on the inside of the can.

Another method of ballast attachment is the use of two-sided foam tape to secure the ballast apparatus to the side or the top surface of the can. This is of particular value when cans do not have holes or slots in the right position to accept the hook 204.

The front panel 231 of the housing box 201 includes the extended portion 211 thereof which extends outwardly from the housing 201. One or more openings 207 are provided through the extended portion 211. In one embodiment, at least one opening 207 is adapted to receive a plug 208 which includes one or more connectors 210 extending therefrom. The plug 208 is passed through opening 207 and latched therein by means of the grippers 209 at the sides of the plug which prevent the plug 208 from being forced backwardly into or through the opening 207. The plug 208 is connected by wires (see FIG. 4) to the ballast within the box 201.

The adapter 250 is typically an injection molded thermoplastic unit which includes a base 251 which is adapted to receive the base of a fluorescent tube (not shown). In addition, a fluorescent light source starter, may be included within the adapter 250. (Alternatively, all of the apparatus necessary to initiate operation of a fluorescent tube may be included within housing 201 along with the ballast).

The base 251 includes an Edison-type, metal screw base 252 which is similar to a conventional incandescent light bulb. Thus, the adapter 250 can be screwed into and threadedly attached to a conventional Edison socket, such as socket 104 shown in FIG. 1.

The adapter 250 includes an inner surface 253 which includes the appropriate openings 254 and 255 to receive the base and conductive electrode of a conventional fluorescent light bulb (not shown). This arrangement creates the shortest possible light source configuration. In addition, it can be used as a bare tube conversion.

In a preferred embodiment, the adapter 250 includes threads molded into the outer surface of the collar 256. Thus, the adapter 250 can accept screw-on reflectors (see FIG. 5) made of metal, plastic or aluminized glass in various reflector, flood or decorative shapes and sizes. This reflector (often referred to as "glass") is adapted to surround and envelop the fluorescent light bulb (not shown) in a conventional sense. Of course, the collar 256 can be threaded on either the inner or the outer surface thereof.

The reflector attachment (see FIG. 5) substantially improves the efficiency of the device by increasing the amount of light that is delivered in the desired direction. Decorative globes or other shapes may be used to hide the bare fluorescent tube for a more acceptable appearance.

A wire 270 extends outwardly from the base 251 and is connected to a receptacle 221. The receptacle 221 is arranged to connect with plug 208. When thus connected, the circuit with the ballast and the socket base is completed. The plug 208 and the receptacle 221 are, preferably, formed in an appropriate fashion so as to provide a "coded" connection so that the plug and receptacle are not connected incorrectly. The use of a pigtail arrangement with plug-in receptacles in the assembly allows the adapter 250 to be permanently installed thereby capturing the incandescent socket 104 and preventing reinsertion of an incandescent light bulb. In the event that the ballast burns out, it can be disconnected from the adapter and replaced without disturbing the adapter which is now permanently installed and cannot be removed. The method of establishing a "permanent" adapter can be as simple as adding a small amount of glue to the socket 252 before inserting it into the socket 104. Of course, other such techniques can be utilized.

Of course, if permanence of adapter installation is not a requirement, the above design can be modified so that electrical plugs are not used. Rather, the adapter 250 is hard-wired to the ballast apparatus 225. At the end of ballast life, the ballast adapter 225 and adapter 250 are both removed as a unit and discarded.

Figure 4:
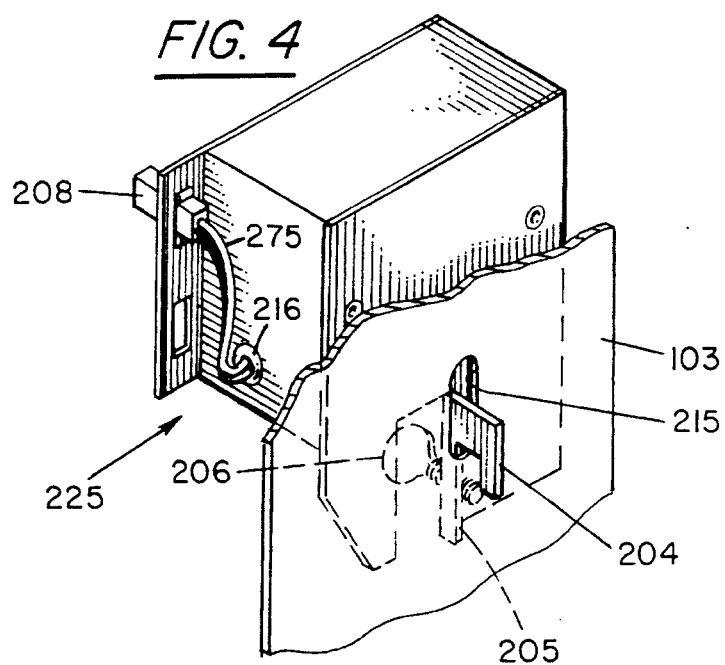

Referring now to FIGS. 3 and 4, there are shown different views of the ballast apparatus 225 mounted to a wall portion 103 of can 102. The can 102, typically, has a plurality of holes 215 therethrough. These holes can be round or elongated, e.g as slots. In mounting the ballast apparatus 225 to the can 102, the hook 204 is passed through the opening 215 in the wall of can 102. The ballast apparatus 225 is then slid forward, wherein the hook 204 engages the wall 102 adjacent to the slot 205. The thumb screw 206 is then turned until it engages wall 102 and securely mounts the ballast apparatus 225 to the wall 102.

As seen in FIG. 4, a receptacle 208 is mounted in opening 207. The receptacle 208 is connected to the ballast coil (not shown) within ballast housing 225 by means of conductors 275. These conductors pass into the housing 225 via aperture 216 which is, preferably, defined by an insulating grommet or the like.

Referring now to FIG. 5, there is shown the fully assembled, recessed light fixture 100 with the retrofit apparatus of the instant invention installed. The light fixture 100 includes the faceplate 101 and the can 102, along with the external wiring 110, as before. In this case, the socket 252 (see FIG. 2) has been threadedly engaged with the Edison socket 104 so that electrical contact is made therewith. A fluorescent light bulb 505 (shown in dashed outline) is inserted into the appropriate slots and openings in the adapter base 250 (see FIG. 2). The threaded end 301 of glass 300 is threadedly attached to the threaded collar 256 of the adapter 250.

The ballast apparatus 225 is mounted inside the can 102 by any of the techniques described supra. For example, hook 204 is inserted through opening 215 in wall 102 and thumb screw 206 tightened, as shown and described relative to FIG. 3. The wire 270 is connected to the connector 221 which is connected to receptacle 208 wherein the ballast apparatus 225 is electrically connected "in-line" relative to the fluorescent light bulb 505, noted above.

In the preferred embodiment, the fluorescent adapter 250 engages only one leg of the electrical circuit. Since the circuit is not complete, the fluorescent socket can be installed but will not operate.

However, connecting the plug-in pigtail 270 and 221 from the adapter 250 into the mating connector 208 on the ballast apparatus 225 completes the circuit. (Of course, in the hardwired version, this conection is already completed).

Figure 6:
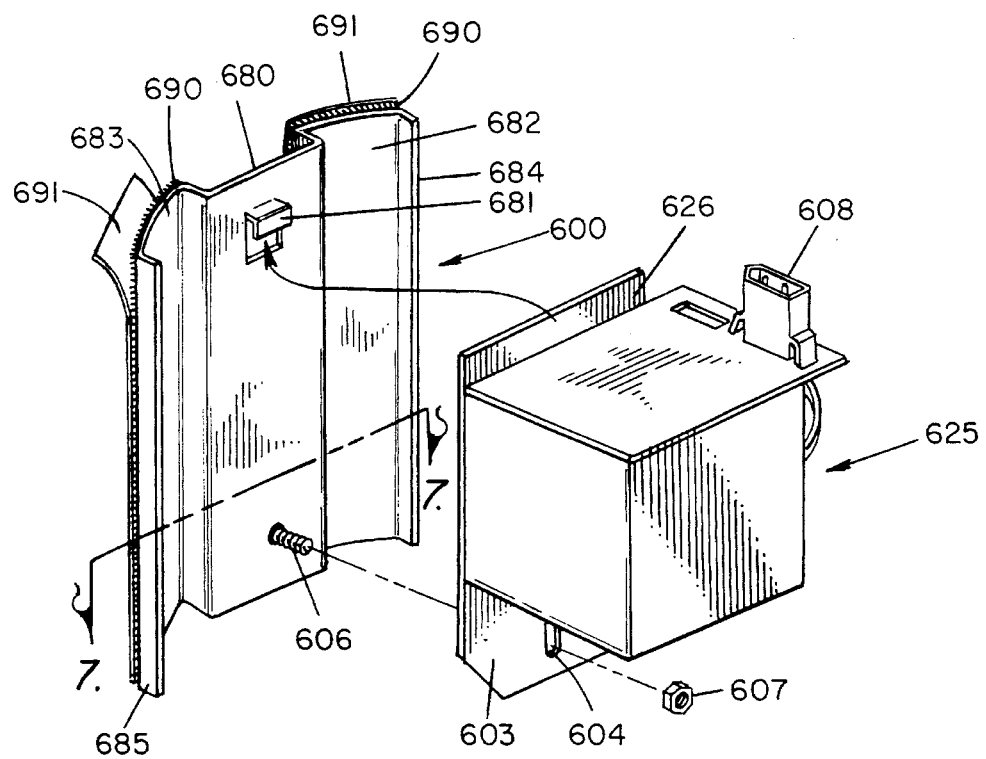
FIG. 6 is an exploded view of a mounting adapter and a ballast apparatus which can be mounted thereon.

Referring now to FIG. 6, there is shown an exploded view of a modified embodiment of the ballast housing 625 and the mounting bracket 600. In this embodiment, the extended side panel 603 of the ballast housing is of the same general shape and configuration as the extended side panel 203 of the embodiment shown and described supra. However, in this instance, the extended side panel does not include the hook portion. Rather, this embodiment of the ballast housing is for use in conjunction with those lighting cans 102 which do not include apertures in the sides thereof. In this case, the extended side panel 603 includes an elongated aperture 604 or slot therethrough for receiving a mounting mechanism such as a threaded stud 606 or the like.

The bracket 600 includes a center channel 680 to which the threaded stud 606 is mounted adjacent one end. The stud can be integrally formed with the channel. Alternatively, the threaded stud can be a bolt or screw which extends through an appropriate opening in the channel. In the preferred embodiment, the threaded stud 606 is firmly affixed to or integrally formed with the channel in order to provide rigidity and strength thereto.

Also, in some embodiments, hook 681 is formed at the other end of the channel. The hook or tab can also be integrally formed in the channel 681 or firmly affixed thereto. For example, a portion of the channel can be cut and folded to form the hook. Alternatively, a separate piece can be formed and affixed to the channel by means of welding, riviting, adhesive or the like.

On each side of the elongated channel member is a respective elongated arm 682 or 683. The arms extend from the interior edge of the channel and extend outwardly from the channel. The arms, in a preferred embodiment, have an appropriate arc so that the pair of arms mate smoothly with the interior surface of the wall of a can 102.

The outer extremities of the arms can be folded or bent to provide lips 684 and 685 which instill rigidity and/or strength to the arms. A suitable adhesive material 690 is placed on the outer surface of each of the arms. The adhesive material can take the form of two-sided tape or the like. In the typical application, the adhesive is adhered to the outer surface of the arms with a release liner 691 on the outer surface thereof. When the release liner is removed, the mounting bracket 600 is placed inside the can 102 and caused to adhere thereto by placing the respective arms against the inner surface of the can.

When the bracket 600 has been adhered to the inner surface of the wall of can 102, the ballast housing 625 is mounted thereto. The upper edge 626 or lip of the housing 625 is inserted under the hook 681. The aperture 604 in the extended side panel 603 of the housing 625 is placed over the threaded stud 606 to afford initial positioning. A threaded nut 607 is then applied to the threaded stud to maintain the housing in place.

Other than the modification to the aperture and type thereof which is formed in the extended side panel, the ballast housing is substantially identical to the ballast housing noted relative to FIG. 4. It is contemplated that the adhesive material on the back surfaces of the bracket will be fabricated of a long-lasting adhesive which does not deteriorate over time, especially when subjected to heat which could be caused by a bulb.

Figure 7:
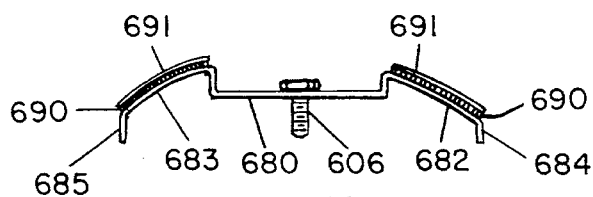
FIG. 7 is a cross sectional view of the mounting adapter taken along the lines 7—7 in FIG. 6.

FIG. 7 is a cross-sectional view of the bracket 600 taken along the line 7—7 in FIG. 6. This view shows the relationship of the arms 682 and 683 to the central channel 680. The lips 684 and 685 are shown bent away from the respective arms. The adhesive layer 690 is disposed on the outer surface of the arms 682 and 683. The release liner 691 is disposed on the adhesive layer 690.

In this view, the threaded stud 606 is shown extending through the channel 680. This stud can be welded in place. Alternatively, the stud 606 can be integral with the channel 680, a separate bolt, or a bolt welded to the channel portion of the bracket 600.

Figure 8:
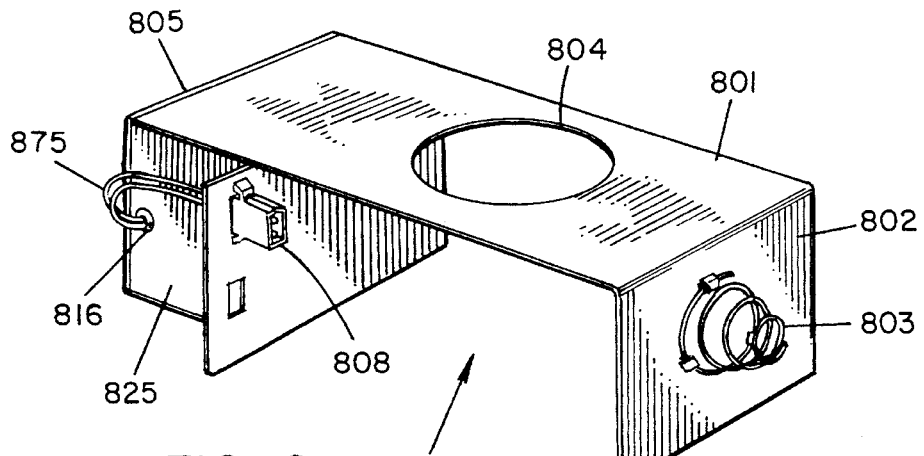
FIG. 8 is a perspective view of another embodiment of the ballast apparatus portion of the kit shown in prior figures.

Referring now to FIG. 8, there is shown another embodiment of the invention. In this embodiment, the ballast housing 825 remains largely the same and encloses a ballast. The wires 875 are connected through the grommet 816 to the receptacle 808, for example. However, in this embodiment the ballast housing includes an elongated side panel 801 which extends beyond the dimensions of the housing 825.

At the other end thereof, the side panel 801 is joined to a leg 802. The leg 802 can be formed, for example, by bending down the end of panel 801.

A coil spring 803 is attached to the outer surface of leg 802 in any suitable fashion. The coil spring can be replaced by a leaf spring or any other resilient device as described hereinafter.

A relatively large opening 804 is provided through the side panel 801.

An optional retention device 805, for example, a strip of two-sided tape or the like can be placed on the outer surface of housing 825. Alternatively, a spring (or other retention device similar to the coil spring 803) can be used in lieu of the tape 805.

The ballast/support bracket apparatus 800 is useful in virtually any light fixture, especially those fixtures which utilize cans 102 without apertures in the sides thereof. Thus, apparatus 800 is inserted into can 102 (after the incandescent bulb has been removed) and placed as far into the can as possible. The aperture 804 in panel 801 of apparatus 800 is, thus, located at or beyond the base 104 so that easy access to base 104 is permitted. (That is, the adapter 250 will subsequently be inserted into base 104 throught opening 804.)

In this positioning of the apparatus 800 in can 102, the spring 803 (or other retention device) is compressed so as to apply a sufficient force to secure the apparatus 800 within the can 102. As noted, the optional retention device 805 can apply a similiar force or, alternatively, establish an adhesive-type connection with the can 102. Thereafter, the adapter 250 can be installed and the pigtail connection (as shown in FIG. 2) can be completed.

The light fixture 100 is, in essence, unchanged. In most cases, it has not been removed from its mounting position. It is possible that the L-shaped or U-shaped mounting bracket 103 may be adjusted. However, this is typical and usual in recessed light fixtures anyway. The ballast apparatus 225 and the adapter 250 are in place, wherein a fluorescent light bulb 505 can be used with the system. The light fixture 100 need not be removed and/or replaced. In fact, while not recommended, it is not even necessary to turn off the power during this conversion or retrofit. Consequently, significant savings of time and resources can be effected.

Although the primary intent of this invention is to convert down lights, other designs are envisioned. By replacing the mounting plate on the ballast with a flat plate or a plate with ears for mounting, the invention can, with equal ease, be used to retrofit almost any incandescent lighting fixtures, such as mounted ceiling fixtures, wall fixtures, pendant fixtures, outdoor post top fixtures and the like. The flat ballast mounting plate can be attached inside the fixture to be converted and attached with screws or two-sided tape. All other features and advantages as outlined above would pertain to these other types of fixtures which are retrofitted with this invention.

One of the important aspects of this type of device is its unique two-piece design. The medium screw shell based fluorescent lamp adapter accepts a low wattage single ended PL-type fluorescent lamp. A ballast assembly is provided that is easily installed inside a down light without the use of conventional "wire nut", electrical connections or the need for a qualified electrician to install the retrofit. The two-part design, i.e. socket and remotely mounted ballast apparatus, permits the shortest possible length of the installed light source which is desirable and is made possible by installing the bulky ballast assembly off to one side.

Thus, there is shown and described a unique design and concept of a light fixtures, in general. The purpose of this invention is to convert energy-robbing incandescent fixtures to energy efficient fluorescent fixtures. It has become common for utility companies to offer rebates or other types of incentive to induce their customers to convert their incandescent fixtures to fluorescent in an effort to conserve energy and reduce the total load on the utilities' electrical delivery system. The particular configuration shown and described herein relates to a light fixture which is readily converted from a conventional light source to a fluorescent light source which uses a ballast. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

We claim:

1. A retrofit apparatus for converting, in situ, an existing light fixture enclosure having an Edison-socket mounted therein from operation with an incandescent light source to operation with a fluorescent light source comprising, a ballast apparatus which can be mounted within the existing light fixture enclosure, in situ, said ballast apparatus includes a housing means, said housing means includes attachment means for attaching said housing means to an interior surface of said existing light fixture enclosure, an adapter which is configured at one end thereof to receive a base of a fluorescent light source, said adapter is configured at an opposite end thereof to threadedly engage the existing Edison-socket mounted in said existing light fixture enclosure, and electrical connection means for connecting said ballast apparatus in circuit between the base of the fluorescent light source and the existing Edison-socket via said adapter within said existing light fixture enclosure.

2. The apparatus recited in claim 1 wherein, said electrical connection means includes plug means and receptacle means whereby said electrical connection means can be selectively disconnected.

3. The apparatus recited in claim 1 wherein, said adapter includes a threaded lip adjacent said one end which threaded lip is adapted to threadedly receive a reflector means.

4. The apparatus recited in claim 1 wherein, said attachment means includes hook means which selectively engages a portion of said existing light fixture.

5. The apparatus recited in claim 2 wherein, said receptacle means is mounted to said ballast apparatus.

6. The apparatus recited in claim 4 wherein, said attachment means includes clamp means which selectively engages said existing light fixture.

7. The apparatus recited in claim 1 including, bracket means adapted to be attached to the interior surface of said existing light fixture enclosure to selectively support said ballast apparatus.

8. The apparatus recited in claim 7 wherein, said bracket means includes adhesive means for attaching said bracket means to the interior surface of said existing light fixture enclosure.

9. The apparatus recited in claim 7 wherein, said bracket means and said ballast apparatus are integrally formed.

10. The apparatus recited in claim 9 wherein, said bracket includes retention means at at least one end thereof.

11. The apparatus recited in claim 3 including, reflector means threadedly attached to said adapter means.

12. The apparatus recited in claim 1 wherein, said existing light fixture enclosure includes an external face plate.

13. The apparatus recited in claim 9 wherein, said existing light fixture enclosure includes an external trim ring attached to said external face plate.

14. The apparatus recited in claim 2 wherein, said housing means supports one of said plug means and said receptacle means of said electrical connection means.

15. The apparatus recited in claim 10 wherein, said retention means comprises resilient means.

16. The apparatus recited in claim 15 wherein, said resilient means comprises a coil spring.

* * * * *